(12) United States Patent
Godbole

(10) Patent No.: US 6,606,675 B1
(45) Date of Patent: Aug. 12, 2003

(54) CLOCK SYNCHRONIZATION IN SYSTEMS WITH MULTI-CHANNEL HIGH-SPEED BUS SUBSYSTEMS

(75) Inventor: Anil V. Godbole, Cupertino, CA (US)

(73) Assignee: Rambus, Inc., Los Altos, CA (US)

( * ) Notice: Subject to any disclaimer, the term of this patent is extended or adjusted under 35 U.S.C. 154(b) by 440 days.

(21) Appl. No.: 09/620,332

(22) Filed: Jul. 20, 2000

(51) Int. Cl.[7] .............................................. G06F 13/00
(52) U.S. Cl. ........................ 710/100; 710/300; 710/305; 710/3.6; 710/311; 710/312; 710/104; 710/105
(58) Field of Search ................................ 710/100, 300, 710/104, 107, 117, 118, 305, 105, 311, 306, 312, 52, 189.01; 326/30; 375/356; 365/189.1, 230.08; 711/167; 713/400, 401

(56) References Cited

U.S. PATENT DOCUMENTS

| | | | | |
|---|---|---|---|---|
| 5,107,465 A | * | 4/1992 | Fung et al. | 365/230.08 |
| 5,210,858 A | * | 5/1993 | Jensen et al. | 713/401 |
| 5,355,391 A | | 10/1994 | Horowitz et al. | 375/36 |
| 5,361,277 A | * | 11/1994 | Grover | 375/356 |
| 5,390,149 A | * | 2/1995 | Vogley et al. | 365/189.01 |
| 5,434,996 A | * | 7/1995 | Bell | 713/400 |
| 5,485,490 A | | 1/1996 | Leung et al. | 375/371 |
| 5,578,940 A | * | 11/1996 | Dillon et al. | 326/30 |
| 5,663,661 A | * | 9/1997 | Dillon et al. | 326/30 |
| 5,920,897 A | * | 7/1999 | Jin et al. | 711/167 |
| 5,991,844 A | * | 11/1999 | Khosrowpour | 710/312 |
| 6,034,878 A | * | 3/2000 | Osaka et al. | 365/52 |
| 6,173,380 B1 | * | 1/2001 | Jin et al. | 711/167 |
| 6,535,411 B2 | * | 3/2003 | Jolin et al. | 365/52 |

OTHER PUBLICATIONS

Rambus Advance Information, "Direct RAC Data Sheet", Aug. 7, 1998, pp. 1–46.
Rambus Preliminary Information, "Direct Rambus® Clock Generator", Version 1.0, Undated, pp. 1–22.
Rambus® Technology Overview, Aug. 1999, pp. 1–10.

* cited by examiner

Primary Examiner—Gopal C. Ray
Assistant Examiner—Justin King
(74) Attorney, Agent, or Firm—Lee & Hayes, PLLC

(57) ABSTRACT

A high-speed bus subsystem includes a plurality of bus channels, wherein each bus channel has an independent channel clock signal generated by an associated channel clock generator. A master device or other interface component receives and utilizes a system clock signal and a channel clock signal for each channel. For each channel, a derivative of the system clock signal and a derivative of the channel clock signal are routed to a clock generator. The clock generator compares the received signals, and generates its channel clock signal at a phase which eliminates any significant phase difference between the system clock signal and the channel clock signal.

18 Claims, 6 Drawing Sheets

CLOCK SYNCHRONIZATION IN SYSTEMS
WITH MULTI-CHANNEL HIGH-SPEED BUS
SUBSYSTEMS

TECHNICAL FIELD

The following relates to bus systems that operate at speeds where propagation delays become significant, and to such systems that include a plurality of bus channels and corresponding bus clocks.

BACKGROUND

High-Speed Bus Overview

FIG. 1 is a block diagram showing a high-speed digital computer bus system 20. The bus system includes a number of discrete devices 22–24, which communicate over an electrical bus 30 at very high speeds. The bus speeds are sufficiently high that propagation delays from device to device must be accounted for very carefully.

The described system includes a master device 22 and a plurality of slave devices 23–24. The master device 22 initiates and controls data exchanges over bus 30. It is located at one end of the bus, referred to herein as the master end of the bus. Slave devices 23–24 are spaced along the remaining portions of the bus, toward its other end. This other end of the bus is referred to herein as the termination end because the individual bus lines at this end are terminated by termination resistances (not shown). The lines are unterminated at the master end of the bus.

Devices 22–24 transfer data synchronously, with reference to the signal edges of two bus clock signals: CLOCK-TOMASTER (CTM) 32 and CLOCKFROMASTER (CFM) 34. These signals are part of bus 30, although they are shown separately for clarity.

CTM 32 is generated by a clock source 36 at a desired bus frequency such as 400 MHz. The clock source signal is connected to CTM 32 at the termination end of the bus, so that the clock signal propagates from the termination end to the master end. At the master end, in close physical proximity to the master device 22, the CTM signal turns around and becomes CFM 34. The CFM signal then propagates back from the master end to the termination end of the bus, where it is terminated with a resistance $R_{term}$. Because of propagation delays, the phase of CTM and CFM vary along the length of the bus. This variation is significant in relation to the frequency of the signals.

Each of devices 22–24 is coupled and configured to synchronize with the edges of CTM and CFM. Slave devices 23–24 transmit data with the edges of CTM 32 and receive data with the edges of CFM 34. Master device 22 transmits data with the edges of CFM 32 and receives data with the edges of CTM 34. Clock and data signals remain synchronized as they propagate toward their destinations because the clock lines are configured to have the same device-to-device delays as the other lines of bus 30.

Examples of this configuration are implemented in systems that comply with a standard specified by Rambus, Inc, of Mountain View, Calif. High-speed memory devices that comply with the Rambus standard are becoming widely available. Details and specifications regarding the Rambus standard are available directly from Rambus.

Master Device Access Logic

The high-speed bus system described above is typically part of a larger system 36, such as (for example) a computer motherboard or other system board. Within such systems, the master device typically acts as an interface between the bus system and the larger system.

FIG. 2 shows a master device 22 that connects to and communicates through a high-speed bus or bus subsystem such as shown in FIG. 1. Master device 22 is typically an ASIC (application-specific integrated circuit) containing custom logic circuits. It connects to a high-speed bus 30 such as shown in FIG. 1 and to other system components, such as components of a motherboard on which the high-speed bus subsystem is integrated.

Master device 22 includes access logic 46 for communicating properly over bus 30, in accordance with the electrical specifications defined for the bus. In many systems, access logic 46 comprises a custom macro cell, available from Rambus, Inc., that can be easily incorporated into an ASIC. This cell performs all the signal voltage conversions required to communicate with the high-speed bus channel.

Synchronization

Typically, a bus system 20 such as shown in FIG. 1 will run much faster than components of the larger computer system of which bus system 20 is a part. In addition, clock source 36, if left to run independently, is not synchronized with other computer components. However, inconvenient to synchronize bus system 20 with the components of the larger computer system data transfers to and from bus system 20 through ASIC 22. Specifically, synchronization of the high-speed bus subsystem to the other circuits of a system reduces or eliminates data transfer latencies that might otherwise become necessary.

FIG. 3 shows one prior art technique for achieving such synchronization. This technique synchronizes the information flow between the master device and its access logic.

The synchronization system shown in FIG. 3 includes a master device 50 (implemented as an ASIC) that interfaces between a high-speed bus subsystem and other components. The ASIC includes a user-designed portion 52 and a high-speed bus-interface portion 54, also referred to as access logic. As described above, the access logic 54 is supplied from Rambus as a custom macro cell. The high-speed bus-interface portion runs in synchronization with the CTM and CFM signals discussed above.

The system includes an external system clock source 56 that generates an ASIC clock signal PCLK. PCLK is used as a system clock within the user designed portion 52 of the ASIC.

CTM is generated by an external clock generator 58 and received by the access logic portion of ASIC 50. CTM is also received by other bus devices (not shown).

Because of bus propagation delays, the phase of CTM varies as it travels from clock generator 58 to ASIC 50. CTM is 400 MHz in this example, but is divided by four within access logic 54 to produce a 100 MHz clocking signal for use within access logic 54. This internal clocking signal is called SYNCLK.

The purpose of the synchronization described herein is to match both the frequency and phase of PCLK and SYNCLK at the boundary between user-designed portion 52 and access logic 54. Such synchronization allows data transfers across this boundary without additional latency.

Synchronization is performed by external clock generator 58, in response to the PCLK and SYNCLK signals. PCLK and SYNCLK are routed from the ASIC to external clock generator 58 with signal traces that are matched in both impedance and propagation delay, on the ASIC as well as on the board upon which the components are mounted. These signal lines are not part of the high-speed bus.

Before PCLK and SYNCLK are routed from ASIC 50, they are divided appropriately by ratio logic 60 so that they both have the same frequency. Specifically, PCLK is divided by M to produce PCLK/M, and SYNCLK is divided by N to produce SYNCLK/N.

Clock generator 58 generates CTM based on a signal REFCLK. REFCLK may be derived from the system clock source 56. However, this is not required—there is no requirement regarding phase alignment of these two signals. In response to REFCLK, clock generator 58 generates CTM at a frequency that is either equal to that of REFCLK or is some even multiple of the REFCLK frequency.

Clock generator 58 has logic to compare the phases of PCLK/M and SYNCLK/N, and to delay CTM by an amount that eliminates any significant phase difference between PCLK/M and SYNCLK/N. This, in turn, ensures that PCLK and SYNCLK are in sync within ASIC 50. Such synchronization allows low-latency data transfers between user-designed portion 52 and high-speed bus-interface portion 54.

Rambus, Inc., has designed a circuit that performs the functions of clock generator 58. This circuit is known as the Direct Rambus® Clock Generator (DRCG). Specifications are available from Rambus. Actual embodiments of this clock generator are available from several electronics manufacturers. Details regarding high-speed bus-interface portion 54 are also available in data sheets available from Rambus that describe Rambus' "DRAC" (Direct Rambus® ASIC Cell) product.

Synchronizing Multiple High-Speed Bus Channels

High-speed bus 30 (as specified by Rambus, Inc.) can achieve data transfer speeds of up to 1.6 Gbytes/second. However, applications with much higher bandwidth requirements are becoming common. This has created a need to use multiple high-speed bus channels, and to incorporate multiple high-speed bus-interfaces (such as access logic 54) on single ASICs. Furthermore, there is often a need for each of these bus channels to be synchronized with each other and with a clock signal (PCLK, for example) used by components other than the high-speed bus subsystem.

Rambus' existing DRAC product provides for such synchronization as shown in FIG. 4. ASIC 70 of FIG. 4 includes two high-speed bus-interface portions or DRACs 72 and 74. Interface 72 is connected as already described with reference to FIG. 3, to supply SYNCLK to a clock generator 76 through ratio logic 78. User-designed logic 80 receives PCLK from a clock source 75. The clock source also provides a reference clock to clock generator 76.

Clock generator 76 generates CTM, which is buffered using a clock buffer driver chip 77 to produce individual, synchronized clock signals CTM1 and CTM2. Access logic 72 uses CTM1, while access logic 74 uses CTM2.

Interfaces 72 and 74 comprise the predefined Rambus DRAC circuitry mentioned above. Each DRAC includes an input called SYNCLKIN, which is used to synchronize two DRACs. The DRAC which forms interface 72 has a SYNCLKFD output signal which corresponds in phase and frequency to SYNCLK. SYNCLKFD of interface 72 is connected to the SYNCLKIN input of interface 74. DRAC 74 has internal circuitry for synchronizing its internal SYNCLK signal with the signal received at SYNCLKIN. This also requires matching CTM2 with CTM1, resulting in a synchronized phase between the SYNCLK signals of the two interfaces 72 and 74.

This arrangement works well in certain situations. However, the following conditions need to be met:

The routing delay of the signal trace from SYNCLKFD to SYNCLKIN should be under a nanosecond.

The phase difference between CTM1 and CTM2 should be within 100 picoseconds. This requires that the individual clock traces (CTMS) be closely matched (within a few microseconds).

The PCLK signals received by both DRACs should be in phase to within a few hundred picoseconds.

The first of these requirements is becoming increasingly difficult to provide, because of the very large die sizes being used on current-generation ASICs. The second requirement is also difficult at times, and usually demands tight tolerances from board layout tools. The second requirement also necessitates an additional clock driver chip, which increases costs significantly.

Thus, there is a need for a method of synchronizing multiple high-speed bus interfaces in this environment, in a manner that will relax some of the requirements found in prior art methods.

SUMMARY

Described below is a technique for interfacing to a high-speed bus subsystem having a plurality of bus channels, wherein each bus channel has an independent channel clock signal. A master device or other interface component receives and utilizes a system clock signal and a channel clock signal (generated by one of the clock generators) for each channel.

Each channel has a clock generator. For each channel, a derivative of the system clock signal and a derivative of the channel clock signal are routed to a clock generator of the type described above. The clock generator compares the received signals, and generates its channel clock signal at a phase which eliminates any significant phase difference between the system clock signal and the channel clock signal.

Each channel clock signal is synchronized with the system clock signal using this technique, with an independent clock generator being used to generate the channel clock signal for each channel. This ensures that the system clock signal and each channel clock signal are in phase within the interface component.

DETAILED DESCRIPTION

The following description sets forth a specific embodiment of a high-speed bus synchronization technique that incorporates elements recited in the appended claims. The embodiment is described with specificity in order to meet statutory requirements. However, the description itself is not intended to limit the scope of this patent. Rather, the inventor has contemplated that the claimed invention might also be embodied in other ways, to include different elements or combinations of elements similar to the ones described in this document, in conjunction with other present or future technologies.

Computer System and High-Speed Bus Subsystem

Figure 1:
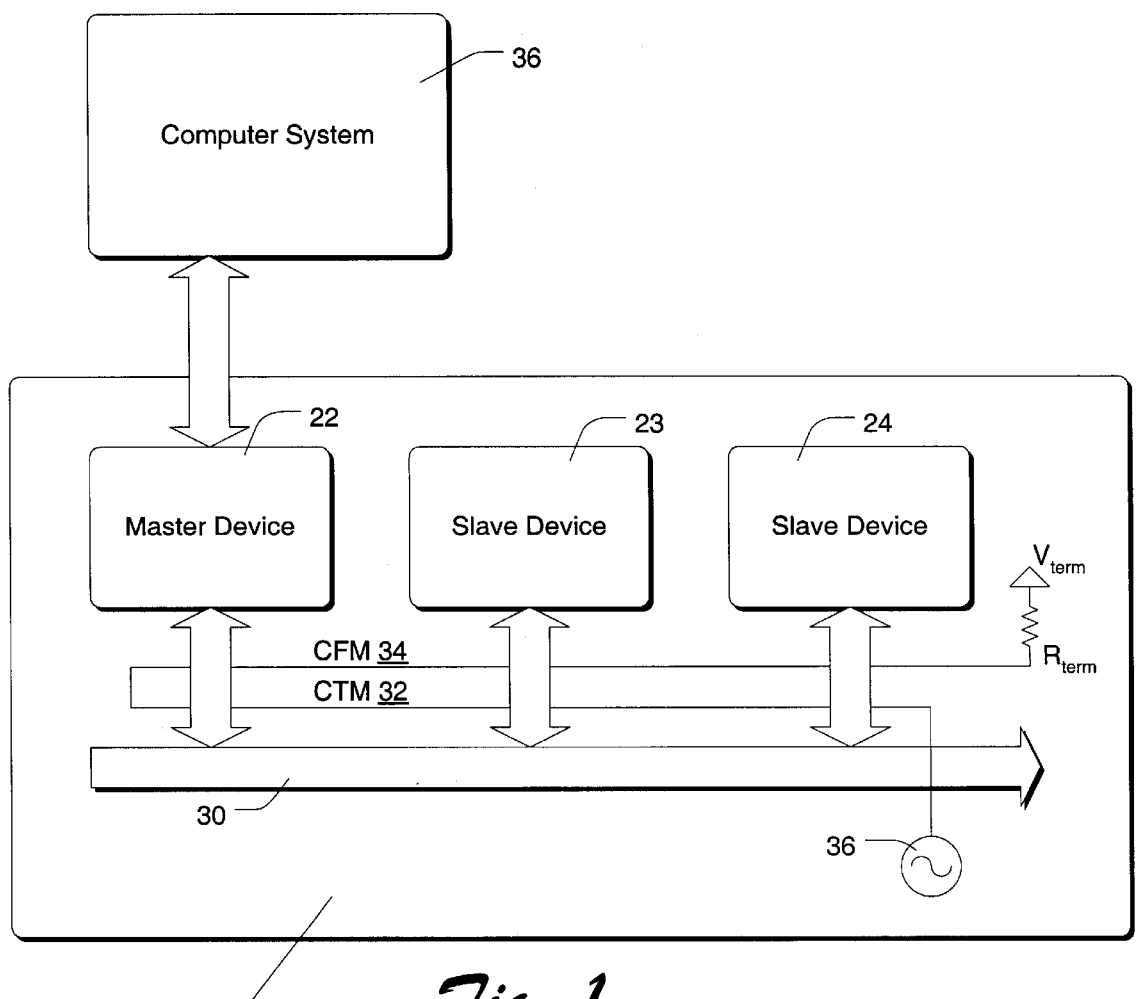
FIG. 1 is a block diagram of a high-speed bus system in accordance with the prior art.
Figure 2:
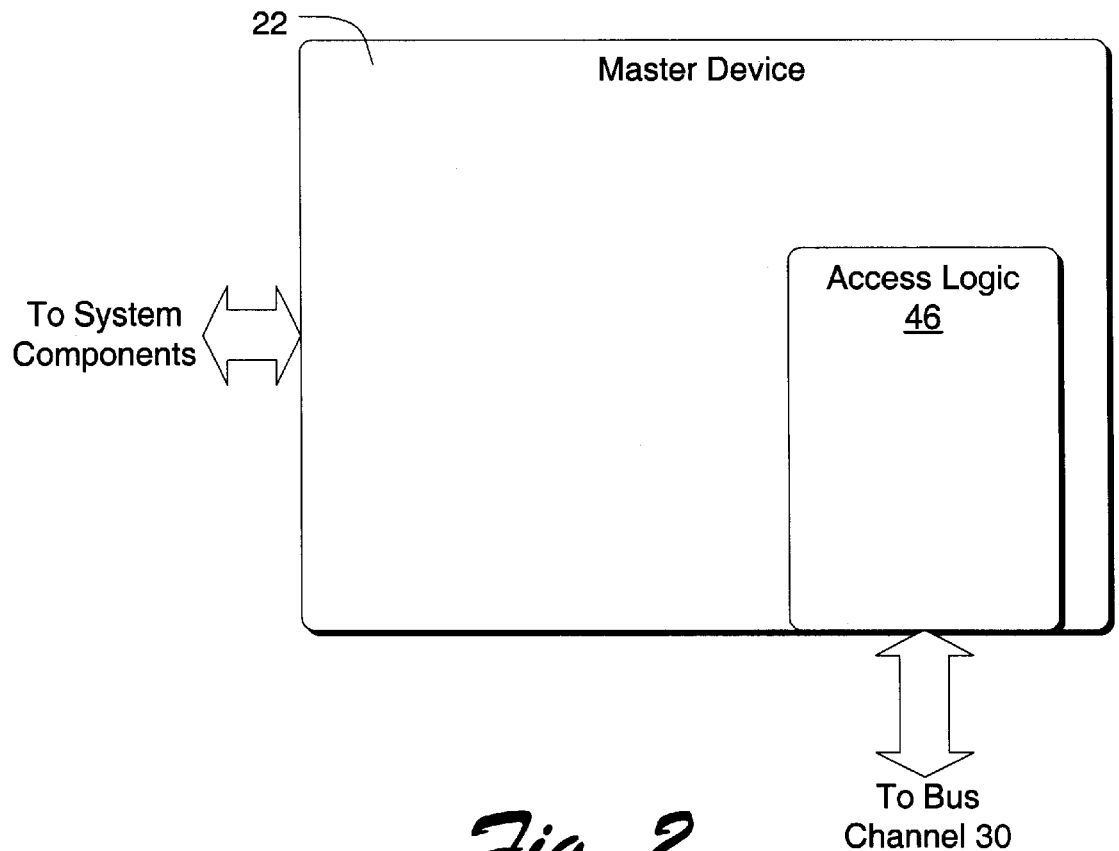
FIG. 2 is a block diagram of a master device in accordance with the prior art.
Figure 3:
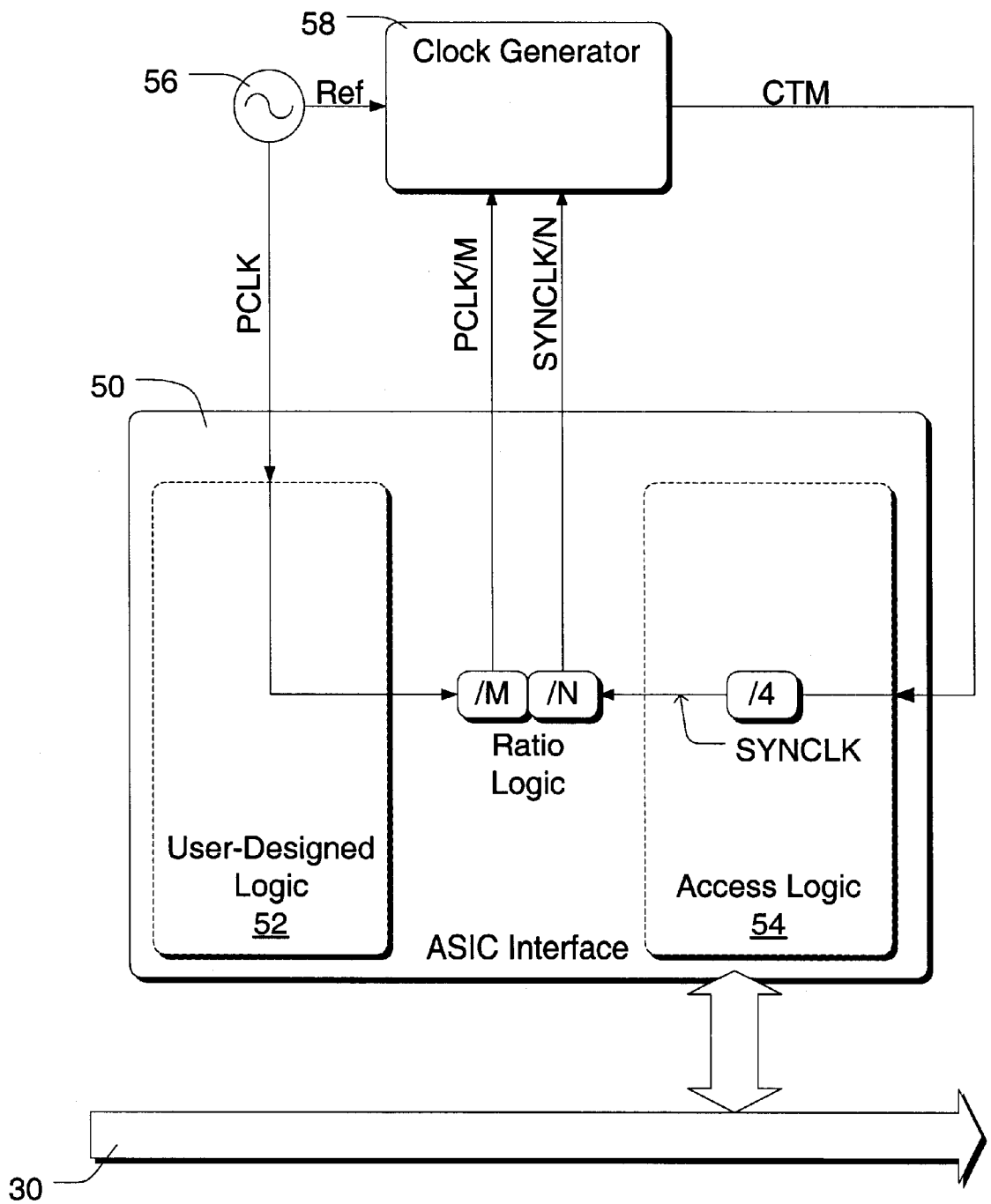
FIG. 3 is a block diagram showing a clock synchronization technique in accordance with the prior art.
Figure 4:
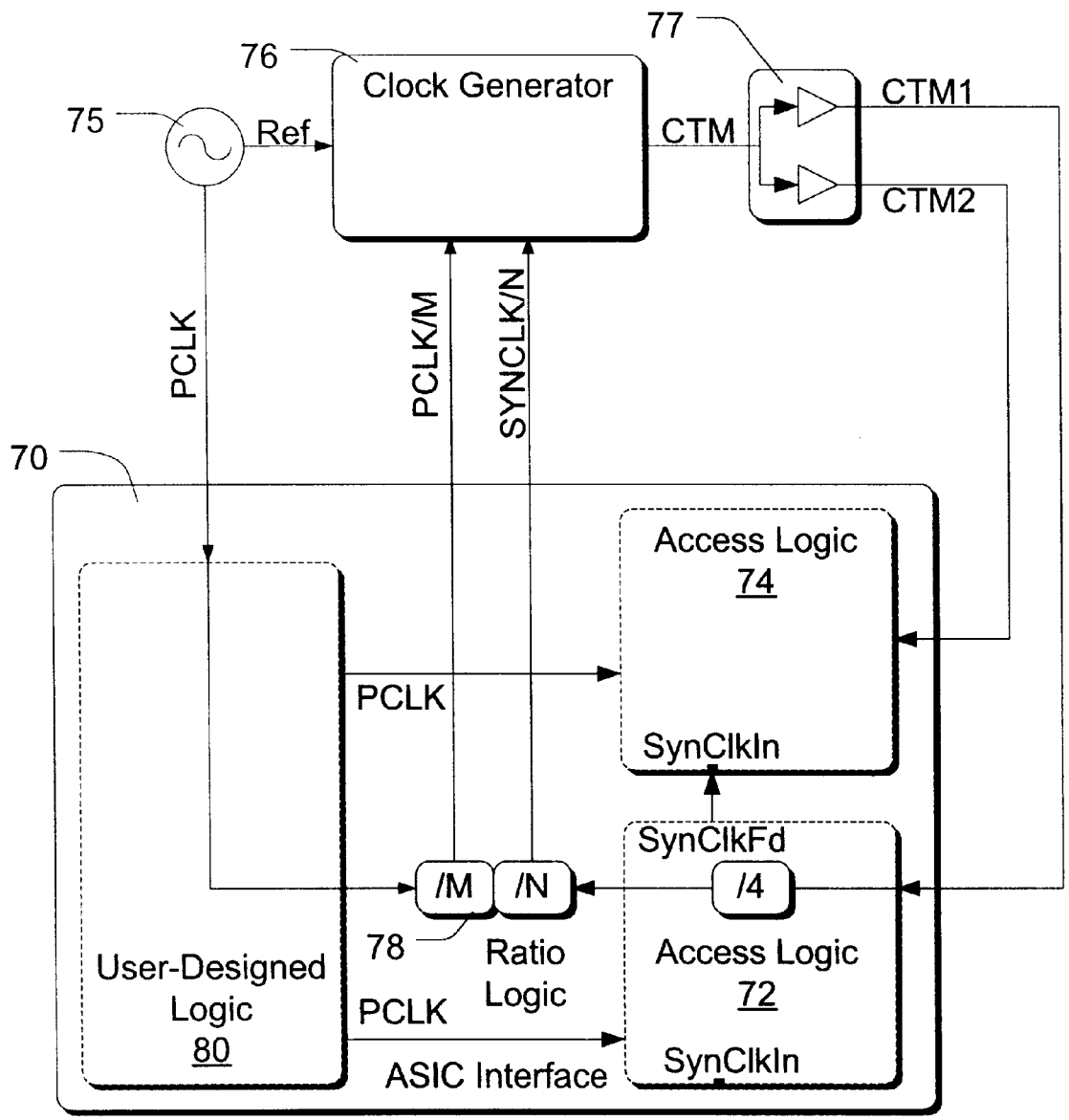
FIG. 4 is a block diagram showing a clock synchronization technique in accordance with the prior art, in a system having a plurality of bus channels and channel clock signals.
Figure 5:
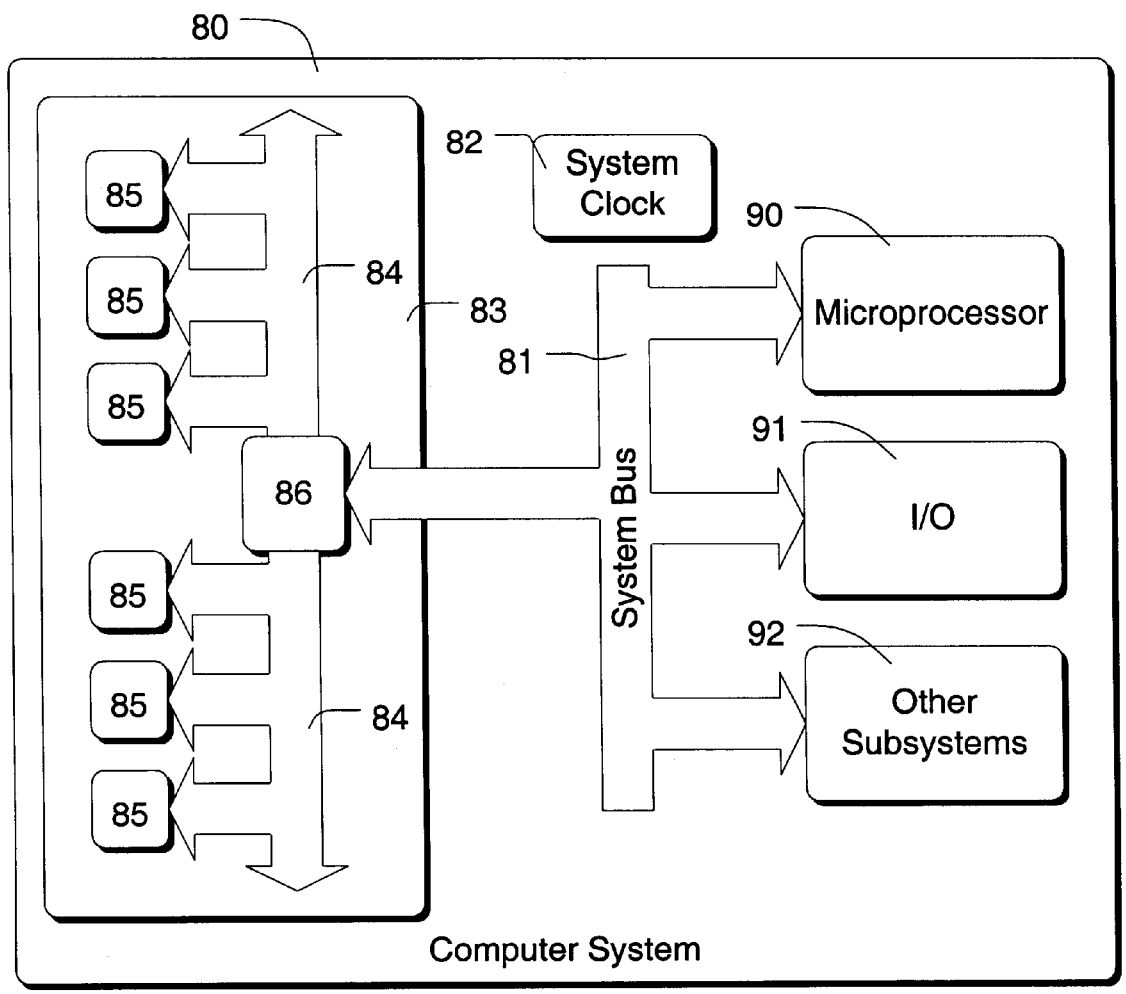
FIG. 5 is a block diagram of a computer system utilizing a high-speed bus subsystem having a plurality of bus channels.

FIG. 5 shows a computer system 80 having a plurality of components and subsystems. The computer system might comprise a conventional desktop computer, or it might comprise some other computer or computer-like device such as a portable computer, a handheld computer, a video game unit, or any other type of device in which high-speed digital data transfers might be desirable. Furthermore, the system might be implemented with non-programmable hardware, using hardwired logic or similar components rather than instruction-oriented processors and peripherals.

Computer system 80 comprises a plurality of components and/or subsystems, a system bus 81, and a system clock 82. Clock source 82 generates one or more clock signals used for data transfers between various system components and subsystems of the computer system.

The system includes a high-speed bus subsystem 83 of the type discussed above, which is designed and specified by Rambus, Inc., of Mountain View, Calif. As mentioned above, details regarding this bus specification are publicly available from Rambus.

The bus subsystem comprises a plurality of high-speed data communications channels 84. For simplicity, only two communications channels are shown, although some systems might include more than ten such channels. Each channel has its own CTM and CFM bus clock signals as described above. CTM originates at the termination end of its bus channel and propagates toward the master end. At the master end, CTM turns around and become CFM as it propagates back toward the termination end of the bus channel.

The bus channels and their clock signals operate at very high speeds, at which the propagation delays of various signals become significant. The phases of the channel clock signals (CTMs) vary along the length of the channels because of such propagation delays.

The bus subsystem includes bus devices or circuits 85, including a master device and one or more slave devices. Each of these devices has interface circuitry for communicating with one of bus channels 84. In order to transfer data between the bus subsystem and the other portions of computer system 80, one of the bus devices 86 (typically the master device) is an interface component. The interface component includes logic for transferring data between computer 80 and its high-speed bus subsystem.

In addition to the high-speed bus subsystem, system 80 has other components and subsystems, such as a microprocessor 90, I/O circuits and components 91, and other components or subsystems 92. The illustrated system is merely exemplary of a vast variety of systems that might be implemented in conjunction with a high-speed subsystem.

Interface Circuit and Synchronization

Figure 6:
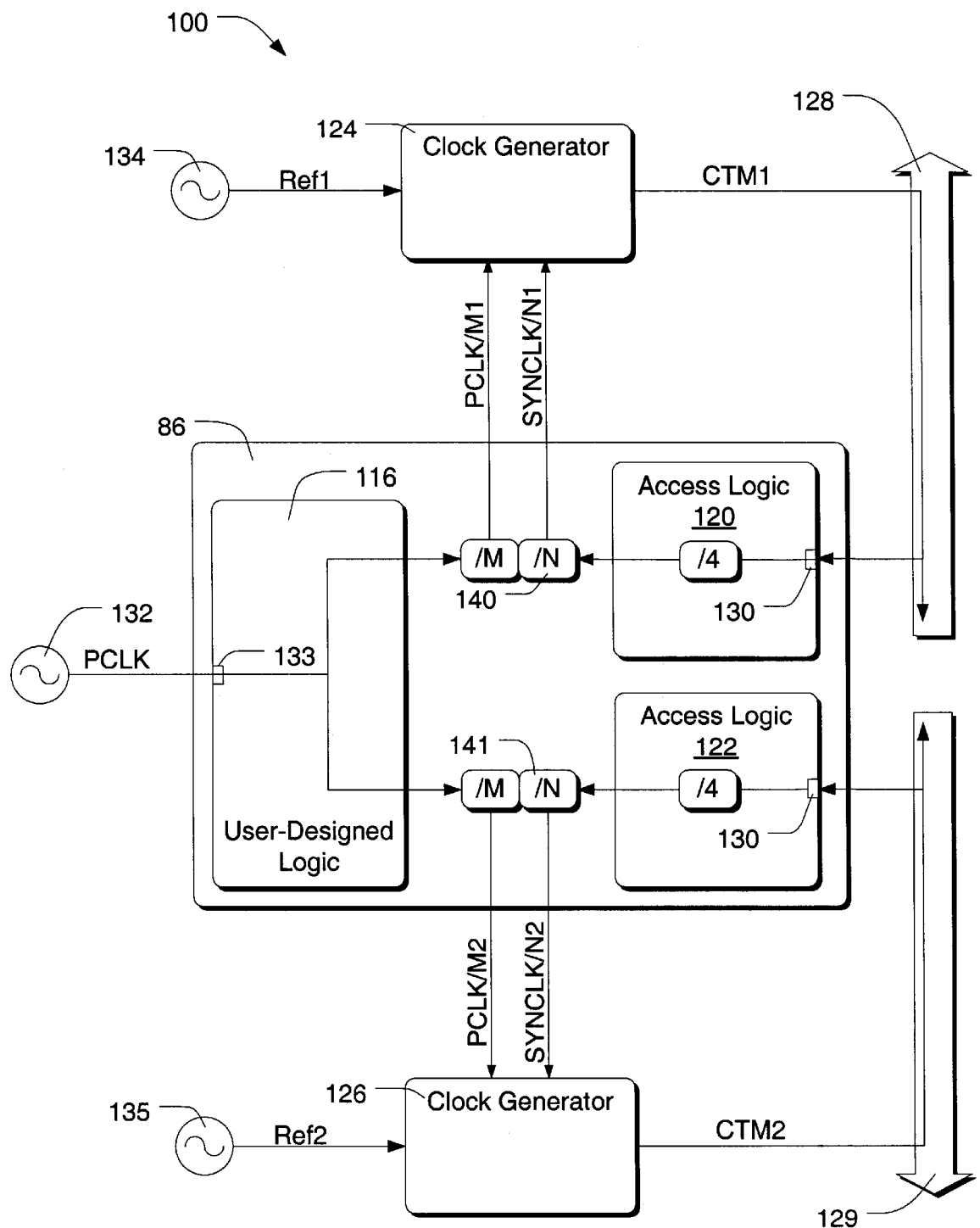
FIG. 6 is a block diagram illustrating a clock synchronization technique within the computer system shown in FIG. 5

FIG. 6 shows details of an interface circuit 100 that includes interface component 86. The interface circuit is implemented as part of the high-speed bus subsystem, for transferring data between the high-speed bus subsystem and the other subsystems and components of the system.

The interface component 86 is an ASIC or other integrated circuit that contains user-designed logic 116 and a plurality of bus access circuits, also referred to as access logic. In this example having two bus channels, two bus access circuits 120 and 122 are shown, corresponding to the two bus channels 128 and 129. More generally, there is an access circuit corresponding to each bus channel. Each bus access circuit is configured to transfer data via a corresponding channel of the high-speed bus subsystem.

The bus access circuits are preferably implemented with the Rambus predefined or prepackaged DRAC products described above. They contain logic for receiving data from the high-speed bus, for formatting such data in a parallel format for more efficient retrieval by external circuitry, and for inverse write operations. The bus access circuits also perform electrical conversions between the CMOS signals of computer system 100 and the electrically incompatible signals used on the high-speed bus channels themselves.

The DRAC access logic components are designed to produce a SYNCLKFD signal and to optionally receive a SYNCLKIN signal. However, these signals are not used in interface component 86.

Interface circuit 100 includes a plurality of clock generators 124 and 126, corresponding respectively to the two bus channels 128 and 129, and to the two bus access circuits 120 and 122. A first clock generator 124 generates a first channel clock signal (CTM1) which is used in conjunction with first bus channel 128. A second clock generator 126 generates a second channel clock signal (CTM2) which is used in conjunction with second bus channel 129. Each bus access circuit has a channel clock input 130 configured to receive the channel clock signal of the channel corresponding to the bus access circuit.

A clock source 132 represents the system clock 82 (FIG. 5) that is used by other subsystems of system 80. It produces a system clock signal PCLK that is used within user-designed logic 116. PCLK indicates the clock phase used by one or more of the other subsystems that comprise computer system 80. Interface component 108 has a system clock input 133 configured to receive PCLK.

In addition, two reference clock signals Ref1 and Ref2 are derived from clock sources 134 and 135. In some cases, Ref1 and Ref2 are derived from the system clock signal. In either case, Ref1 and Ref2 are intended to have a known frequency relationship with PCLK. However, there is no requirement regarding phase alignment of Ref1 and Ref2 with respect to each other or to PCLK.

Clock generators 124 and 126 receive the respective reference clock signals and in response generate CTM1 and CTM2 at a frequency that is either equal to that of the reference clock signals or is some integer multiple thereof. Each clock generator comprises a Direct Rambus® Clock Generator (DRCG), available from Rambus. Each clock generator is associated with one bus channel, and generates the channel clock signal for that bus channel.

Each bus access circuit receives the channel clock signal (CTM1 or CTM2) corresponding to the bus channel of the access circuit. A divided (by four) form of this clock signal, referred to as SYNCLK, is used as a local channel clock signal within the bus access circuit, to coordinate bus transfers with the corresponding bus channel.

Interface component 86 has ratio logic 140 and 141 corresponding to each bus access circuit. Each ratio logic circuit receives PCLK from user-designed logic 116 and SYNCLK from the associated bus access circuit. The ratio logic divides these two clock signals appropriately so that they have the same frequency, producing forms of the PCLK and SYNCLK signals that are referred to as PCLK/M and SYNCLK/N. These signal names are descriptive of the fact that PCLK is divided by M to produce PCLK/M, and SYNCLCK is divided by N to produce SYNCLK/N. In some cases, either or both of M and N might be equal to one. After the division, PCLK/M still has a known and fixed frequency relationship with the system clock signal PCLK. Similarly, SYNCLK/N still has a known and fixed frequency and phase relationship SYNCLK and with the channel clock signal corresponding to the bus access circuit.

The PCLK/M and SYNCLK/N signals are routed to the appropriate clock generator 124 or 126, using signal traces that are matched in length and impedance. Each clock generator is configured as already described to adjust the phase of its bus channel clock (CTM1 or CTM2) to align the phases of the local system clock signal PCLKIN and the local channel clock signal SYNCLKIM received by the clock generator.

Because SYNCLKN is derived independently for each bus channel, and is provided with PCLK/M to a different clock generator for each channel, the channel clock signal of each bus channel is synchronized independently with the system clock PCLK. Because each channel clock signal CTM1 or CTM2 is synchronized to the same PCLK signal, the two channel clock signals are also synchronized with each other. However, some of the stringent requirements of the prior art are relaxed. Specifically, there are no difficult routing requirements caused by the prior art use of the SYNCLDFD output and SYNCLKIN input. In addition, there is no longer any need to match CTM traces and other channel traces between the plurality of channels. Furthermore, there is no longer any requirement for an expensive clock buffer driver chip.

CONCLUSION

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. A system comprising:
   a high-speed bus subsystem having a plurality of high-speed data communications channels, each high-speed data communications channel having a channel clock signal whose phase varies along the length of the channel because of propagation delays;
   one or more other subsystems,
   an interface component that transfers data between the high-speed bus subsystem and the other subsystems;
   each interface component having a plurality of bus access circuits configured to transfer data via corresponding channels of the high-speed bus subsystem;
   each bus access circuit having a channel clock input configured to receive the channel clock signal of the channel corresponding to the bus access circuit;
   the interface component having a system clock input configured to receive a system clock signal that indicates a clock phase used by one or more of the other subsystems;
   a plurality of clock generators that generate the channel clock signals of the bus channels, each clock generator being associated with one of the bus access circuits and receiving:
      a reference clock signal that has a fixed and known frequency relationship to the system clock signal;
      a local system clock signal that is derived from the system clock signal, the local system clock signal having a known and fixed frequency relationship with the system clock signal;
      a local channel clock signal that is derived from the channel clock signal received by the, bus access circuit, the local channel clock signal having a known and fixed frequency relationship with said channel clock signal;
   each clock generator being configured to adjust the phase of its channel clock signal to align the phases of the local system clock signal and the local channel clock signal received by the clock generator.

2. A system as recited in claim 1, further comprising ratio logic in the interface component that frequency divides at least one of the channel clock and system clock signals to produce the local system clock signal and the local channel clock signal.

3. A system as recited in claim 1, further comprising ratio logic in the interface component that frequency divides at least one of the channel clock and system clock signals, the signals being divided by respective amounts to produce local system and local channel clock signals of the same frequency.

4. A system as recited in claim 1, wherein the interface component is embodied within an integrated circuit.

5. A system as recited in claim 1, wherein the interface component is embodied within an integrated circuit and the clock generators are embodied on different integrated circuits.

6. A system as recited in claim 1, wherein the local system clock signal is derived in the bus access circuit associated with the clock generator.

7. A system as recited in claim 1, wherein at least two of the plurality of clock generators receive reference clock signals that are not in phase with one another.

8. A system as recited in claim 1, wherein the reference clock signal received by one of the plurality of clock generators has a frequency that is not identical to a frequency of the system clock signal.

9. An interface circuit that transfers data between a high-speed bus subsystem and other system components, the interface circuit comprising:
   a plurality of bus access circuits configured to transfer data via corresponding channels of the high-speed bus subsystem, each such channel having a channel clock signal, each bus access circuit having a channel clock input configured to receive the channel clock signal of the channel corresponding to the bus access circuit;
   a system clock input configured to receive a system clock signal that indicates a clock phase used by the one or more of the other system components;
   a plurality of clock generators that generate the channel clock signals of the bus channels, each clock generator being associated with one of the bus access circuits and receiving:
      a reference clock signal that has a fixed and known frequency relationship to the system clock signal;
      a local system clock signal that is derived from the system clock signal in the bus access circuit associated with the clock generator, the local system clock signal having a known and fixed frequency relationship with the system clock signal;

a local channel clock signal that is derived from the channel clock signal received by the bus access circuit, the local channel clock signal having a known and fixed frequency relationship with said channel clock signal;

each clock generator being configured to adjust the phase of its channel clock signal to align the phases of the local system clock signal and the local channel clock signal received by the clock generator.

10. An interface circuit as recited in claim 9, further comprising ratio logic that frequency divides at least one of the channel clock and system clock signals to produce the local system clock signal and the local channel clock signal.

11. An interface circuit as recited in claim 9, further comprising ratio logic that frequency divides at least one of the channel clock and system clock signals, the signals being divided by respective amounts to produce local system and local channel clock signals of the same frequency.

12. An interface circuit as recited in claim 9, wherein the bus access circuits are embodied within an integrated circuit.

13. An interface circuit as recited in claim 9, wherein the bus access circuits are embodied within an integrated circuit and the clock generators are embodied on different integrated circuits.

14. A method of synchronizing bus channel clock signals in a high-speed bus subsystem having a plurality of high-speed data communications channels, each high-speed data communications channel having a channel clock signal whose phase varies along the length of the channel because of propagation delays, the high-speed bus subsystem having a plurality of bus access circuits in an integrated circuit that transfers data via corresponding channels of the high-speed bus subsystem; the method comprising:

receiving the channel clock signal of the channel corresponding to the bus access circuit;

receiving a system clock signal that indicates a clock phase used by components outside of the high-speed bus subsystem;

generating a local channel clock signal within each bus access circuit, the local channel clock signal having a known and fixed frequency relationship with the channel clock signal received by the bus access circuit;

generating a local system clock signal within the integrated circuit, the local system clock signal having a known and fixed frequency relationship with the system clock signal;

generating a reference clock signal that has a fixed and known frequency relationship to the system clock signal;

receiving the following signals at each of a plurality of clock generators that are associated with the respective bus access circuits to generate the channel clock signals:

the reference clock signal;

the local system clock signal of the bus access circuit associated with the clock generator;

the local channel clock signal of the bus access circuit associated with the clock generator;

within each clock generator, adjusting the phase of the channel clock signal to align the phases of the local system clock signal and the local channel clock signal received by the clock generator.

15. A method as recited in claim 14, further comprising frequency dividing at least one of the channel clock and system clock signals to generate the local system clock signal and the local channel clock signal.

16. A method as recited in claim 14, further comprising frequency dividing at least one of the channel clock and system clock signals, the signals being divided by respective amounts to produce local system and local channel clock signals of the same frequency.

17. A method as recited in claim 14, further comprising embodying the interface component within an integrated circuit.

18. A method as recited in claim 14, further comprising embodying the interface component within an integrated circuit and the clock generators on different integrated circuits.

* * * * *

UNITED STATES PATENT AND TRADEMARK OFFICE
CERTIFICATE OF CORRECTION

PATENT NO. : 6,606,675 B1 Page 1 of 1
DATED : August 12, 2003
INVENTOR(S) : Godbole It is certified that error appears in the above-identified patent and that said Letters Patent is hereby corrected as shown below:

Column 2,
Line 26, replace "inconvenient" with -- it is convenient --.
Line 28, insert -- to facilitate -- between "system" and "data".

Column 7,
Line 19, replace "PCLKIN" with -- PCLK/N --.
Line 20, replace "SYNCLKIM" with -- SYNCLK/M --.
Line 22, replace "SYNCLKN" with -- SYNCLK/N --.

Signed and Sealed this

Twenty-fourth Day of February, 2004

JON W. DUDAS
*Acting Director of the United States Patent and Trademark Office*